(12) United States Patent
Poulis et al.

(10) Patent No.: US 6,567,472 B1
(45) Date of Patent: May 20, 2003

(54) SYSTEM AND METHOD FOR TERMINATING A LINE BY REFLECTING A SCALED IMPEDANCE

(75) Inventors: Spiro Poulis, Kearns, UT (US); John Evans, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,485

(22) Filed: May 26, 1999

(51) Int. Cl.[7] .............................. H04B 3/08; H04L 25/03
(52) U.S. Cl. ..................... 375/257; 375/222; 375/377; 330/260; 333/17.3; 379/394
(58) Field of Search ................................. 375/219, 220, 375/222, 257, 377; 330/260, 277, 278; 333/17.3, 24 R; 379/394, 399.01

(56) References Cited

U.S. PATENT DOCUMENTS

| | | | |
|---|---|---|---|
| 4,395,590 A | | 7/1983 | Pierce et al. |
| 5,029,201 A | * | 7/1991 | Bindels .................... 379/93.25 |
| 5,125,027 A | * | 6/1992 | Blaszykowski et al. ... 379/399.01 |
| 5,162,755 A | * | 11/1992 | Mara, Jr. et al. ............. 330/277 |
| 5,181,240 A | | 1/1993 | Sakuragi et al. |
| 5,528,131 A | | 6/1996 | Marty et al. |
| 5,790,656 A | | 8/1998 | Rahamin et al. |
| 5,809,068 A | | 9/1998 | Johnson |
| 5,815,567 A | | 9/1998 | Davis et al. |

\* cited by examiner

Primary Examiner—Young T. Tse
(74) Attorney, Agent, or Firm—Workman, Nydegger & Seeley

(57) ABSTRACT

The present invention provides a line termination circuit for matching the characteristic impedance of a transmission line, or more generally, a network. The present invention receives the voltage as present on the transmission line and attenuates it such that circuit components rated for lower voltages may be used to produce the reflected impedance. The attenuated voltage is placed across a scaled impedance which results in a reflected impedance substantially equal to the characteristic impedance of the transmission line. The line termination circuit uses a feedback loop to reflect the ground referenced scaled impedance across the transmission lines. The circuit generates a current having a value of one over the characteristic impedance of the network, which ensures that the reflected impedance, from the network, is substantially equal to the characteristic impedance of the network.

26 Claims, 2 Drawing Sheets

SYSTEM AND METHOD FOR TERMINATING A LINE BY REFLECTING A SCALED IMPEDANCE

BACKGROUND OF THE INVENTION

1. The Field of the Invention

This present invention relates to the field of telecommunications. More particularly, the present invention relates to interfacing with communication networks requiring a compatible line termination for terminal equipment interfacing with a hosting network.

2. The Prior State of the Art

Modern data transmission devices such as computers are increasingly used in applications that require exchange of data over a communication network. Popular networks for use in propagating data include well established telephone networks. Such networks were originally designed to accommodate, and therefore propagate, the transmission of voice conversations which include very specific bands of frequencies. In order to facilitate propagation of such bands of frequencies across a network, the hosting telephone network specifies a nominal characteristic impedance with which any attaching or associating terminal equipment, such as a modem, must match or approximate in order to facilitate discernable communication therebetween.

While the popularity of data exchange devices, such as a computer, are well known, computers cannot directly interconnect with a telephone network without modulating the digital data into frequencies and waveforms compatible for propagation across the telephone network. Terminating equipment, such as modems, are specifically designed for this purpose. In order to exchange and transfer data over transmission lines, the terminating impedance of the terminating equipment should equal the characteristic impedance of the transmission line. In order to meet this requirement, the telephone network providers impedance of the transmission lines to which terminal equipment, such as modems, are connected.

Any generally specified characteristic impedance can only be an approximation of the actual characteristic impedance. This results from such variables as: the variations in the length of the transmission lines to the terminal equipment from the central office; various wiring topologies within an intermediary installation such as a series of parallel transmission lines within a business or other structure; and intrinsic variations in the transmission lines themselves. The actual characteristic impedance presented by the telephone network is difficult to precisely match and is usually only approximated.

The ability to precisely match the characteristic impedance of a transmission line has several benefits. First, if the characteristic impedance is matched by the terminal equipment, then the system is able to transfer the maximum amount of power or signal energy. This is important in transmission line applications because of the noise present in the transmission lines. The transfer of maximum power maximizes the signal to noise ratio which enables the data transfer rate to also be maximized. Second, signal reflections can be avoided. When a terminal equipment capable of sending and receiving signals over a transmission line sends a signal when the characteristic impedance is not matched, the sent signal is reflected and becomes part of the signal received by the terminal equipment. This reflected signal can corrupt the original receive data signal and must therefore be removed before the receive signal can be interpreted. A terminal equipment having an impedance that matches the actual impedance of the network can avoid this problem.

The problems associated with signal reflections have been handled in a variety of ways. One method is to employ an echo cancellation circuit. An echo cancellation circuit may employ digital signal processing to cancel the echo, but echo cancellation algorithms are computationally intense. Further, it is very difficult to remove only the echo without affecting the original signal because of the phase shifts attributable to the mismatched impedances. In sum, the necessity of an echo cancellation circuit; whether it be digital or analog, coupled with the mismatched impedances can lead to reduced transmission capacity as well as data errors.

Another method for matching the characteristic impedance of a transmission line is to terminate the transmission line by switching better matched impedances through relays or field effect transistor (FET) switches. This method has several disadvantages. First, control circuitry must be employed to control the relays and switches, which is not a trivial task because of the high voltages which may be present on many transmission lines. Because of the high voltages, the components used for the switches and relays can be large and expensive and must be rated to withstand the high voltages which can be present on a transmission line such as a telephone network.

The need for these types of relays and switches presents an additional problem for persons using terminal equipment such as a PCMCIA modem. The high voltage relays and FET switches, in addition to being costly, consume a large part of the surface area of the printed circuit board (PCB) disposed within the PCMCIA cards and, with regard to PCMCIA cards, surface area is limited and therefore critical.

It would therefore be an improvement to provide a system to substantially, if not precisely, match the actual or nominal characteristic impedance of a transmission line.

OBJECTS AND SUMMARY OF THE INVENTION

It is an object of one embodiment of the present invention to provide a circuit for substantially matching the characteristic impedance of a transmission line.

It is yet another object of one embodiment of the present invention to provide a circuit for substantially matching a characteristic impedance of a network by reflecting a referenced impedance.

It is yet a further object of one embodiment of the present invention to provide a circuit for terminating a network with a scaled impedance such that the reflected impedance substantially matches the characteristic impedance of the network.

A system and circuit are presented which terminate a transmission line with a reflected impedance substantially equal to the characteristic impedance of the transmission line. Transmission lines, such as those found in telephone networks, often have high potentials or voltages. In order for terminal equipment to effectively communicate and send data over transmission lines, the terminal equipment must substantially match the characteristic impedance of the transmission line. However, the high voltages present on many transmission lines make the task of matching the characteristic impedance difficult and costly because the relays and switches required must be rated for high voltages. Also the relays and switches must be triggered at high voltages, which of itself is a difficult task.

The first step of the present invention is to attenuate the transmission line voltage to a level where inexpensive circuit components may be used. In order for the impedance of the terminal equipment to match the characteristic impedance of the transmission line, the present invention uses analog circuit components to generate a current having a value of one over the characteristic impedance of the transmission line. After the line voltage is attenuated, the attenuated voltage is placed across a scaled characteristic impedance.

Both the attenuation of the line voltage and the scaled characteristic impedance are related by a factor Because the line voltage is attenuated and the impedance is scaled, the line current remains unchanged. Thus, the terminating impedance, from the transmission line's point of view, is the same as the characteristic impedance. In other words, the attenuated line voltage is placed across a scaled impedance to produce a reflected impedance substantially equal to the characteristic impedance of the transmission lines.

The present invention can be an integral part of the terminal equipment, or it can be a separate circuit. Because the actual characteristic impedance of a transmission line may vary, the present invention is capable of connecting with a plurality of scaled impedances to insure that the actual impedance is matched as perfectly as possible.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention provides for terminating a transmission line using a scaled impedance to produce a reflected impedance substantially equal to the characteristic impedance of the transmission line. A scaled, ground referenced impedance, is capable of reflecting an impedance substantially equal to the characteristic impedance of the transmission line because the voltage present on the transmission line is lowered or attenuated before being placed across the scaled impedance. The current on the transmission line, however, typically remains the same. The attenuated voltage, enables a scaled impedance to produce, typically, a larger reflected impedance. The reflected impedance is made to appear as if it is placed across the transmission lines. Also, the reflected impedance can be produced using inexpensive circuit components rated for lower voltages.

Figure 1:
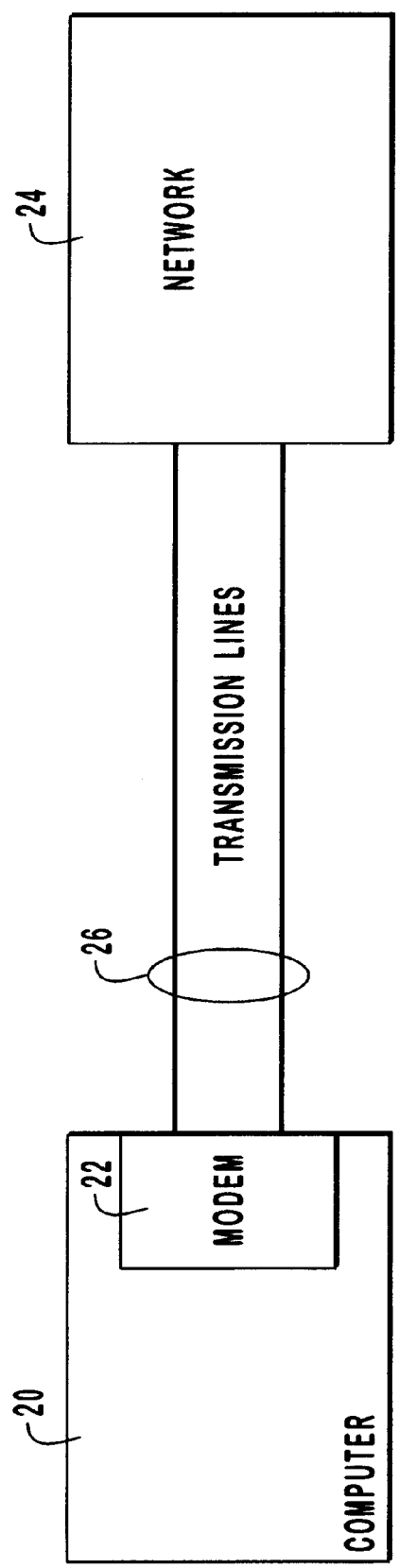
FIG. 1 is a simplified block diagram of a user device, such as a computer terminal having a terminal device such as a modem, interfacing with a telephone network.

FIG. 1 illustrates a computer 20 having terminal equipment, such as modem 22, interfacing with a network 24 via transmission lines 26. In order for data to be received and transferred efficiently and effectively, the terminal equipment, such as modem 22, must meet certain requirements. One of those requirements is to match, as close as possible, the characteristic impedance of transmission lines 26 and network 24. The characteristic impedance of network 24, which includes transmission lines 26, is specified by network 24 and is therefore a known quantity, but can change depending on the factors previously mentioned. Modem 22, by substantially, if not precisely, matching the characteristic impedance or actual impedance of network 24, can transmit and receive signals or data at faster speeds and at maximum power. In other words, network 24 typically specifies a nominal characteristic impedance, herein referred to as $Z_0$, which terminal equipment should attempt to match in order to facilitate data transmission. Typically, the nominal characteristic impedance specified by network 24 includes the impedance of network 24 plus the impedance of transmission lines 26.

Figure 2:
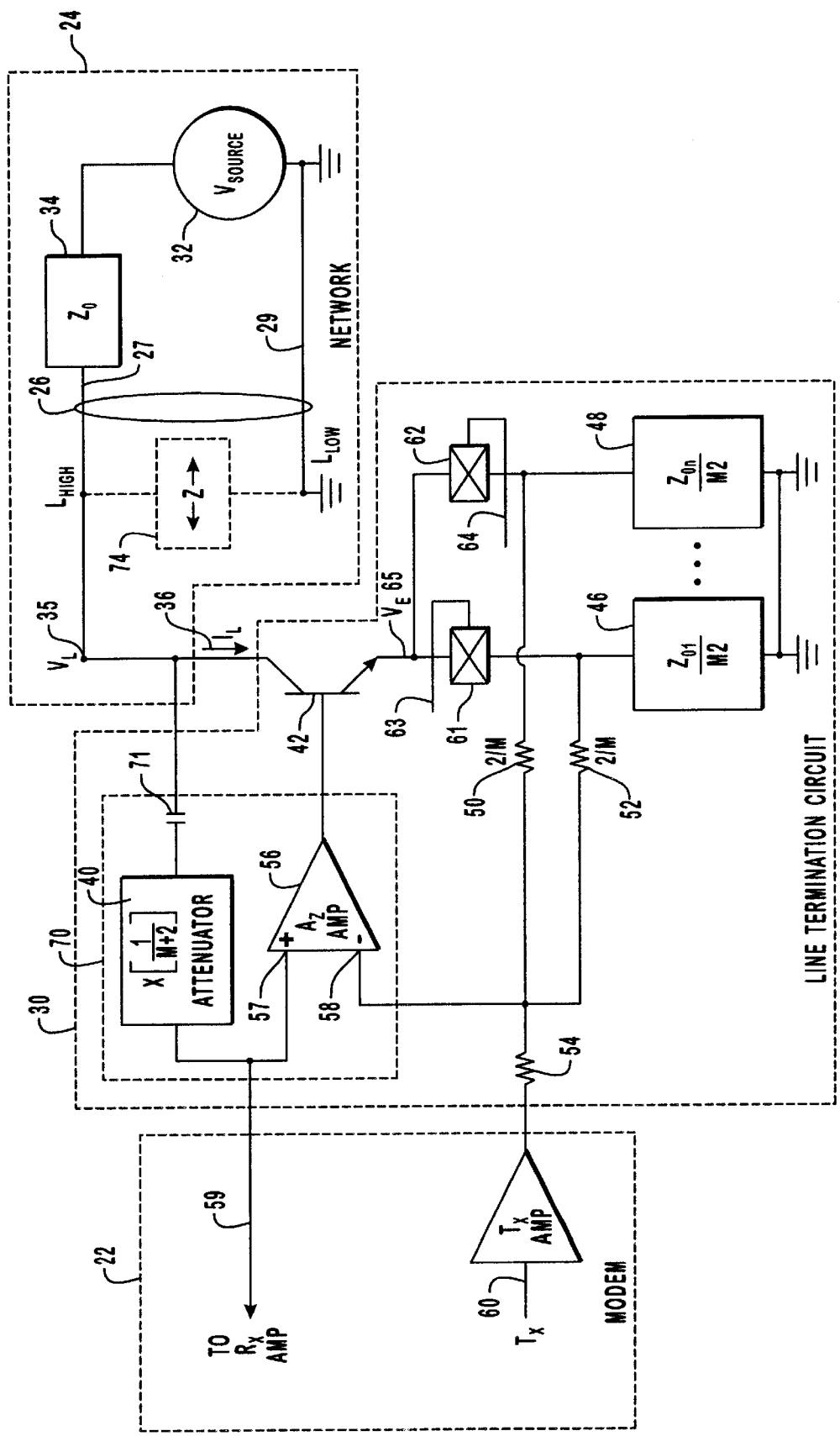
FIG. 2 depicts one embodiment of a line termination circuit for reflecting an impedance which substantially matches the characteristic impedance of a transmission line.

FIG. 2 illustrates a preferred embodiment of a line termination circuit for reflecting an impedance approximately equal to the characteristic impedance of network 24. As illustrated in FIG. 2, network 24 and transmission lines 26 can be viewed as a voltage source $V_0$ 32 and a characteristic impedance $Z_0$ 34. Impedance $Z_0$ 34 is the nominal or characteristic impedance specified by network 24. In this embodiment, transmission lines 26 comprise line high $L_H$ 27 and line low $L_L$ 29. A potential exists between $L_H$ 27 and $L_L$ 29 and is herein referred to as $V_L$ 35. The potential associated with $L_L$ 29 is a reference potential and may or may not be ground. The current present in transmission lines 26 is herein referred to as $I_L$ 36.

According to well established principles, impedance can be easily determined if both voltage and current are known. One purpose of line termination circuit 30 is to match impedance $Z_0$ 34 of network 24 by using the voltage $V_L$ 35 and current $I_L$ 36 present in transmission lines 26. Line termination circuit 30 substantially matches characteristic impedance $Z_0$ 34 of network 24 such that modem 22 may therefore maximize the transfer of data and power to and from network 24.

It is important to note that line termination circuit 30 is not necessarily electrically connected to transmission lines 26 or network 24. In other words, line termination circuit 30 may terminate network 24 with an impedance that substantially matches impedance $Z_0$ 34 without actually connecting that impedance across transmission lines 26.

This is advantageous for a variety of significant reasons. The potentials present on transmission lines 26 can be quite high, up to 350 or more volts. Electrical components capable of switching and relaying the voltages present on transmission lines 26 can be bulky and expensive. It is more economic to utilize circuit components rated for lower voltages. This not only reduces cost, but also eliminates the need for bulky and high voltage switches and relays.

Line termination circuit 30, as illustrated in FIG. 2, will first be described in terms of a signal emanating from voltage source 32 and second in terms of a signal emanating from modem transmit $T_X$ 60. In both instances, line termination circuit 30 ensures that network 24 is terminated with the appropriate impedance and that the proper voltages appear on transmission lines 26.

In many instances, the solution to the problem at hand would be to design a $1/Z_0$ current generator. This is very difficult to do with analog circuit components. Instead, line termination circuit 30 uses actual physical circuit components, including resistors and capacitors, to form physical impedances. These impedances are either substantially equal to impedance $Z_0$ 34, or are scaled versions of impedance $Z_0$ 34. In order to match impedance $Z_0$ 34 of network 24, line termination circuit 30 takes $V_L$ 35 and converts it to a current $I_L$ 36. To accomplish this task, line termination circuit 30 first attenuates $V_L$ 35 such that $I_L$ 36 is generated.

The conversion of $V_L$ 35 to $I_L$ 36 begins by attenuating and adjusting $V_L$ 35 with feedback loop 70. Feedback loop 70 comprises a means for attenuating a line voltage. By way of example and not limitation, means for attenuating is depicted as an attenuator 40, which is capacitively coupled to transmission lines 26 and attenuates $V_L$ 35 by a factor of $[1/(m+2)]$ in this embodiment, where m can be altered or adjusted as needed. Feedback loop further comprises $A_Z$ operational amplifier 56 and output of attenuator 40 is connected at the plus terminal 57 of $A_Z$ operational amplifier 56, which has a gain of $[1+(2/m)]$. The output voltage of $A_Z$ operational amplifier 56 controls the voltage present at the base of transistor 42. Because the base voltage of transistor 42 has been lowered, the emitter voltage $V_E$ 65 of transistor 42 is also significantly lower than $V_L$ 35. The low voltage present at the emitter of transistor 42 enables circuit components with low voltage ratings to be used to produce the impedance to be reflected. The voltage present at the collector of transistor 42 can be high, but the voltage at the emitter of transistor 42 is much lower because of attenuator 40 and $A_Z$ operational amplifier 56.

Because the voltage at the emitter of transistor 42 is lowered, it is necessary to use a scaled impedance in order to assure that the proper impedance is reflected back to network 24. Further, the emitter of transistor 42 can be coupled to a plurality of different scaled impedances using low voltage switches. In FIG. 2, two impedances having different values are illustrated and connected to the emitter of transistor 42 through FET switch 61 and FET switch 62. FET switches 61 and 62 are controlled with control signal 63 and control signal 64. The value of impedances 46 and 48 are determined by the characteristic impedance specified by network 24. Impedance 46 differs from impedance 48 because network 24 may have a different nominal or characteristic impedance. For example, different countries specify different characteristic impedances. In this embodiment, Impedance 46 has a value of $[Z_{01}/m]$ and impedance 48 has a value of $[Z_{02}/m]$. A plurality of impedances having a value of $[Z_{0n}/m]$ can be connected to the emitter of transistor 42 using FET switches or other switching means. The scaled impedances represented by impedance 46 and impedance 48 are local ground referenced. In other words, the reference potential of line termination circuit 30 and network 24 may or may not be the same reference potential.

More specifically, when a signal is transmitted from voltage source 32 to modem 22, impedance $Z_0$ 34 is the characteristic impedance of network 24 which is to be substantially, if not precisely, matched by line termination circuit 30. This is done by producing a reflected impedance to be reflected, herein referred to as $Z_R$, which is equal to $[V_L/I_L]$ as described in equation (1) below.

$$Z_R = V_L/I_l \tag{1}$$

$V_L$ 35, for a signal emanating from voltage source 32 is attenuated by attenuator 40. The output of attenuator 40 is electrically connected with plus terminal 57 of $A_Z$ operational amplifier 56 to produce a voltage at the base of transistor 42. Because attenuator 40, $A_Z$ operational amplifier 56, and impedances 46 and 48 are all related by factor m, $I_L$ 36 will also be present at the emitter of transistor 42 and is defined as:

$$I_L = [V_E/(Z_{0n}/m)] \tag{2}$$

Because the voltage at the base of transistor 42 is substantially equivalent to $V_E$ 65 of transistor 42, $V_E$ 65 can be replaced by the base voltage of transistor 42. This produces:

$$I_L = V_L[1/(m+2)][-2/m]/[Z_{0n}/m], \text{ which reduces to (3)}$$

$$I_L = V_L[1/Z_{0n}] \tag{4}$$

Substituting equation (4) into equation (1) results in:

$$Z_R = V_L/[V_L/Z_{0N}] = Z_{0n}$$

as required. Thus, line termination circuit 30 matches or substantially matches the characteristic impedance of central office 24 without having to connect an impedance across $L_H$ 27 and $L_L$ 29. The impedance of network 24 is terminated by line termination circuit 30 with a substantially matching impedance without having to use bulky and expensive circuit components rated for high voltages. Further, line termination circuit 30 produces a reflected impedance $Z_R$, which is substantially if not precisely, equal to impedance $Z_0$ 34.

For a signal emanating from modem 22, it is necessary to substantially match impedances, which is accomplished when $V_L$ 35 equals $T_X$. In this case, it is again true that:

$$I_L = V_E/[Z_{0n}/m] \tag{5}$$

Because the voltage at the base of transistor 42 is substantially the same as the voltage at the emitter of transistor 42, we can substitute for $V_E$ 65 as follows:

$$I_L = T_X[2/m][Z_{0n}/m] = 2T_X/Z_{0n} \tag{6}$$

where 2/m is the value of resistor 50 and resistor 52 and is also equal to the gain at minus input 58 of $A_Z$ operational amplifier 56. Because transmission line 26 is terminated by impedance $Z_0$ 34 by virtue of feedback loop 70, the total impedance across the line is $Z_0/2$. Thus the line voltage $V_L$ 35 is:

$$V_L I_L [Z_{0n}/2] \tag{7}$$

Substituting $I_L$ from equation (6) into equation (7) yields:

$$V_L = T_X \tag{8}$$

as required in order for the characteristic impedance of network 24 to be substantially matched by line termination circuit 30.

In the embodiment of line termination circuit 30 illustrated in FIG. 2, feedback loop 70 is AC coupled with transmission lines 26 via capacitor 71. The combination of attenuator 40 and $A_Z$ operational amplifier 56 lowers or attenuates the line voltage $V_L$ 35 and is an example of means for attenuating the line voltage $V_L$ 35, as present on network 24.

Transistor 42 is used as a current source and is capable of being electrically connected to the high voltages which may be present on transmission lines 26. Transistor 42 an example of generating a line current $I_L$ 36 which has a value of $[1/Z_0]$. Other circuit components exist which may be used in place of transistor 42. Impedance 46 and impedance 48 are representative of different characteristic impedances specified by varying networks. It is possible to combine impedance 46 and impedance 48, if necessary, to adjust to either an unknown characteristic impedance or an actual characteristic impedance.

Line termination circuit 30 provides a system for attenuating a line voltage such that a scaled impedance can be used to produce a reflected impedance substantially equal to the characteristic impedance of a network such as the telephone network. The reflected impedance appears across network 24. More specifically, the reflected impedance appears across transmission lines 26. The ability to produce this reflected impedance has the advantage of being performed at low voltages. Additionally, line termination circuit can be an integral part of modem 22, or can be separate from modem 22.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a terminal equipment for interfacing with a network having a characteristic impedance, a line termination circuit for substantially matching the characteristic impedance of the network, the line termination circuit comprising:
    means for attenuating a line voltage as present on the network;
    means for generating a line current equal to the line voltage divided by the characteristic impedance of the network, wherein the means for generating the line current is electrically connected to the means for attenuating the line voltage; and
    at least one impedance connected to the means for generating the current, wherein the attenuated line voltage, when placed across the at least one impedance, produces a reflected impedance which substantially matches the characteristic impedance of the network.

2. A line termination circuit as in claim 1, wherein the means for attenuating the line voltage comprises:
    an attenuator capacitively coupled to the line voltage; and
    an amplifier electrically coupled to the attenuator, wherein the amplifier produces a base voltage.

3. A line termination circuit as in claim 2, wherein the attenuator attenuates the line voltage by a factor of $[1/(m+2)]$, wherein m can be altered as needed.

4. A line termination circuit as in claim 2, wherein the amplifier has a gain of $[1+(2/m)]$ when the terminal equipment is receiving a signal from the network and a gain of $[2/m]$ when the terminal equipment is sending a signal to the network.

5. A line termination circuit as in claim 1, wherein the means for generating the line current comprises a transistor.

6. A line termination circuit as in claim 5, wherein the transistor is rated for high voltage.

7. A line termination circuit as in claim 1, wherein the means for attenuating the line voltage comprises a feedback loop, wherein the feedback loop presents the attenuated line voltage to a base of the means for generating the line current.

8. A line termination circuit as in claim 1, wherein the at least one impedance is the characteristic impedance of the network divided by a factor m.

9. A line termination circuit as in claim 1, wherein the reflected impedance is the product of the at least one impedance and the attenuated line voltage.

10. A line termination circuit as in claim 1, wherein the reflected impedance is across the network.

11. A line termination circuit for interfacing a terminal equipment with a telephone network which specifies a characteristic impedance and for terminating the telephone network with a reflected impedance substantially equal to the characteristic impedance, the line termination circuit comprising:
    a feedback loop, electrically coupled to the telephone network, for receiving and attenuating a line voltage of the telephone network;
    a transistor electrically connected to the feedback loop such that the attenuated line voltage is present at the transistor; and
    an impedance electrically connected to the transistor, wherein the impedance is scaled such that the attenuated line voltage produces the reflected impedance substantially equal to the characteristic impedance of the telephone network.

12. A line termination circuit as in claim 11 wherein the feedback loop comprises:
    an attenuator for attenuating the line voltage by a factor of $[1/(m+2)]$, wherein m can be altered as needed; and
    an amplifier, wherein the amplifier receives the attenuated line voltage and produces a base voltage having a gain of $[1+(2/m)]$ when the terminal equipment is receiving a signal from the telephone network, and a gain of $[2/m]$ when the terminal equipment is sending a signal to the telephone network.

13. A line termination circuit as in claim 12 wherein the transistor generates a line current such that the reflected impedance is substantially equal to the characteristic impedance of the telephone network.

14. A line termination circuit as in claim 11, wherein the attenuated line voltage is present at an emitter of the transistor.

15. A line termination circuit as in claim 14, wherein the attenuated line voltage present at the emitter is across the scaled impedance such that a line current is produced having a value of 1 over the characteristic impedance of the telephone network.

16. A line termination circuit as in claim 11, wherein the scaled impedance is scaled by a factor of $[1/m]$.

17. A line termination circuit as in claim 11 wherein the scaled impedance is electrically connected to the transistor with a switch.

18. A line termination circuit as in claim 17, wherein the switch is a field effect transistor.

19. A line termination circuit as in claim 11, wherein the reflected impedance is a product of the attenuated line voltage divided by the scaled impedance.

20. A line termination circuit as in claim 11, wherein the reflected impedance is across the telephone network.

21. In a modem, a line termination circuit for terminating a line with a reflected impedance substantially equal to a characteristic impedance of a network, the line termination circuit comprising:
    an attenuator, wherein the attenuator produces an attenuated line voltage equal to a line voltage reduced by an attenuation factor;

an amplifier electrically connected to the attenuator, wherein the amplifier amplifies the attenuated line voltage to produce a base voltage;

a transistor electrically connected to the amplifier, wherein the transistor has an emitter voltage substantially equal to the base voltage; and at least one scaled impedance, wherein each scaled impedance is electrically connected to the transistor such that the emitter voltage is across the scaled impedance, wherein the emitter voltage produces the reflected impedance substantially equal to the characteristic impedance of the network, whereby the network is terminated.

22. A line termination circuit as in claim 21, wherein the attenuation factor is equal to $[1/(m+2)]$, where m can be altered as needed.

23. A line termination circuit as in claim 21, wherein the amplifier is also electrically connected to a modem transmit amplifier.

24. A line termination circuit as in claim 21, wherein the amplifier produces the base voltage having a gain of $[1+(2/m)]$ when the modem is receiving a signal from the network and a gain of $[2/m]$ when the modem is sending a signal to the network.

25. A line termination circuit as in claim 21, wherein the at least one scaled impedance is equal to the characteristic impedance of the network multiplied by a scaling factor of $[1/m]$.

26. A line termination circuit as in claim 21, wherein the at least one scaled impedance is local ground referenced, whereas the line voltage has the same reference.

* * * * *

UNITED STATES PATENT AND TRADEMARK OFFICE
CERTIFICATE OF CORRECTION

PATENT NO.   : 6,567,472 B1
DATED        : May 20, 2003
INVENTOR(S)  : Spiro Poulis and John Evans It is certified that error appears in the above-identified patent and that said Letters Patent is hereby corrected as shown below:

Column 1,
Line 38, after "providers" insert -- specify a nominal characteristic impedance which roughly approximates the actual --

Column 3,
Line 10, after "factor" insert -- . --

Column 6,
Line 51, change "$V_L I_L [Z_{0n}/2]$" insert -- $V_L = I_L [Z_{0n}/2]$ --

Column 7,
Line 43, before "current" insert -- line --

Column 10,
Line 7, change "[2/m)]" to -- [2/m] --

Signed and Sealed this

Sixteenth Day of September, 2003

JAMES E. ROGAN
*Director of the United States Patent and Trademark Office*